UNITED STATES PATENT OFFICE.

CHARLES F. BARKER, OF BOSTON, MASSACHUSETTS.

IMPROVEMENT IN MAKING ARTIFICIAL MARBLE.

Specification forming part of Letters Patent No. 141,689, dated August 12, 1873; application filed July 17, 1873.

*To all whom it may concern:*

Be it known that I, CHARLES F. BARKER, of Boston, in the county of Suffolk and in the State of Massachusetts, have invented certain new and useful Improvements in Making Artificial Marble; and do hereby declare that the following is a full, clear, and exact description thereof.

The nature of my invention consists in a novel mode of manufacturing artificial marble by the use of certain ingredients, as will be hereinafter more fully set forth.

In order to enable others skilled in the art to which my invention appertains to make and use the same, I will now proceed to describe my mode of making artificial marble, as well as the ingredients used.

I dissolve alum and copperas in water, and in this solution I soak a quantity of gypsum calcined. This is then exposed to the atmosphere until it is apparently dry, when it is again calcined, after which it is ground and sifted to a fine powder. I now make a solution of salt, gum Arabic, and gum Senegal dissolved in water, and with this solution the gypsum is tempered to the consistency of mortar. It is then placed in molds, and allowed to remain until it becomes hard, when it is rubbed with fine pumice until a very smooth surface is obtained. It is then rubbed with a soft cloth wet with oxalic acid dissolved in water until the stone becomes warm, and then polished with a chamois' skin and putty to give it a fine lustre; or a vitreous varnish may be used to polish.

The solutions used in the above process are generally composed of the ingredients in the following proportions: The first solution consists of one pound of alum and one-fourth of a pound of copperas dissolved in one gallon of water; and in this solution about seventy pounds of the calcined gypsum is soaked. The second solution consists of one and a half pound of salt, one ounce of gum Arabic, and one ounce of gum Senegal dissolved in three gallons of water.

I do, however, not confine myself to these proportions, as they may and should be varied according to the different kinds of marble desired.

Having thus fully described my invention, what I claim as new, and desire to secure by Letters Patent, is—

1. In a process for making artificial stone, the combination of salt, gum Arabic, and gum Senegal, for tempering gypsum, substantially as and for the purposes set forth.

2. An artificial stone made of calcined gypsum, alum, and copperas, substantially as described.

In testimony that I claim the foregoing, I have hereunto set my hand and seal this 13th day of May, A. D. 1873.

CHARLES FRANCIS BARKER. [L. S.]

Witnesses:
    WALTER H. MILLER,
    JAMES C. MILLER.